June 25, 1963  T. GOLD  3,094,877
ACCELERATION MEASURING APPARATUS
Filed April 27, 1961
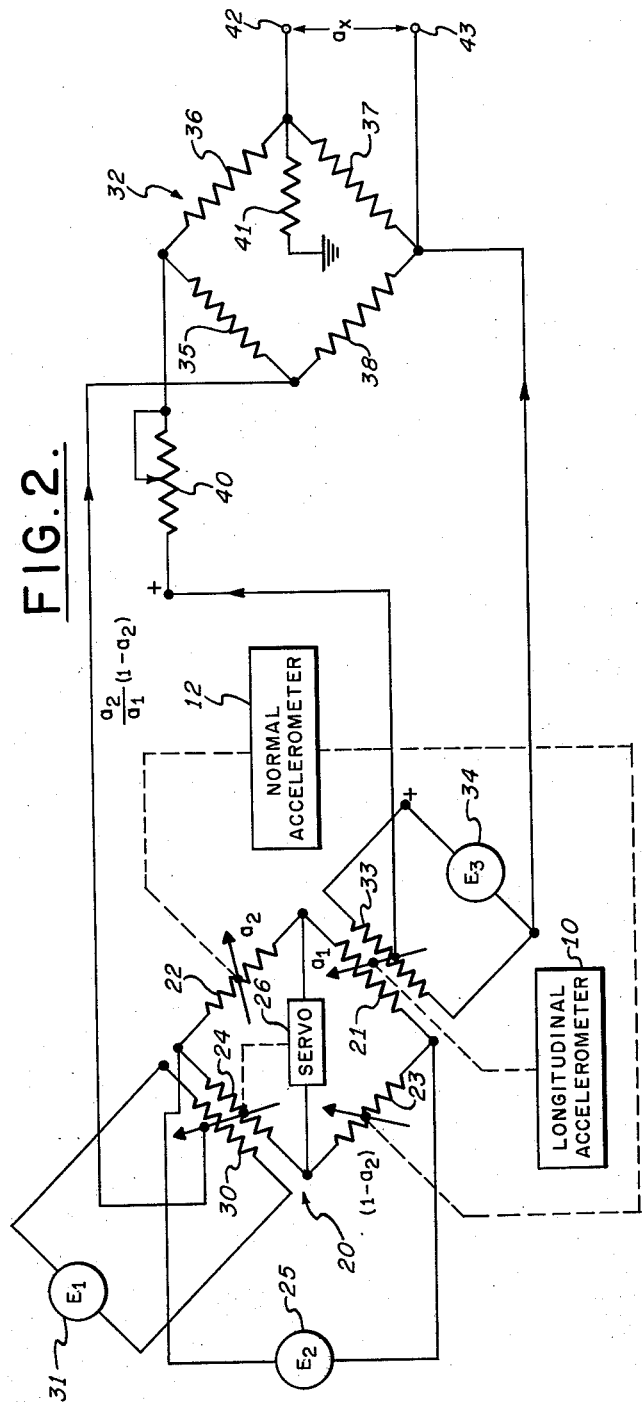
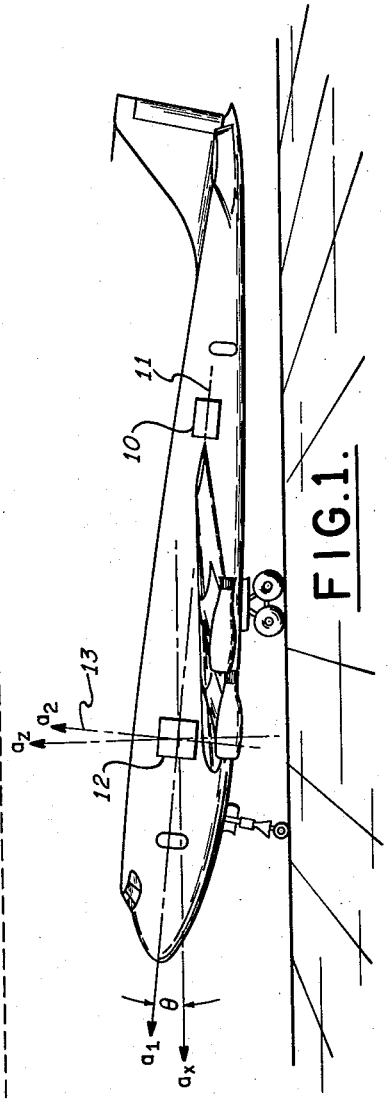
INVENTOR.
THEODORE GOLD
BY
ATTORNEY

3,094,877
ACCELERATION MEASURING APPARATUS
Theodore Gold, Ronkonkoma, N.Y., assignor to Sperry
 Rand Corporation, Great Neck, N.Y., a corporation of
 Delaware
Filed Apr. 27, 1961, Ser. No. 106,072
5 Claims. (Cl. 73—517)

This invention relates to a system for providing a measure of the acceleration of a craft in a reference direction irrespective of the change of attitude of the craft within a predetermined range of attitude change.

The present invention is particularly suitable for providing an accurate measure of the forward acceleration of an aircraft as it accelerates along a fixed straight line in space such as a runway. As more fully explained in my copending application Serial No. 821,035 filed June 17, 1959, entitled Aircraft Take-Off Performance Monitoring Apparatus, it is especially important to obtain an accurate measure of the forward acceleration of an aircraft during its take-off run in order to accurately monitor the take-off performance of the aircraft.

With aircraft whose pitch attitude changes during the take-off run, the accelerometer which is intended to sense the forward acceleration responds to a component of the gravity vertical as well as to the forward acceleration as the pitch attitude changes thereby providing an erroneous indication. The error due to the gravity component may be sufficient to mask the actual performance of the aircraft. Depending upon the direction of the change of pitch attitude, the error may result in an indication that the aircraft performance is satisfactory when in reality it is not or vice versa. While it is absolutely necessary to determine submarginal aircraft performance during take-off for obvious reasons, it is also desirable to avoid unnecessary abortion of the take-off when aircraft performance is satisfactory. An abortion of the take-off of a modern jet airplane usually results in considerable discomfort to the occupants as well as wearing out the brake linings and tires which must then be replaced.

The determination of the forward acceleration of an aircraft or other vehicle moving along a fixed, straight line path in space such as a runway by means of an accelerometer as a sensor is usually accomplished in one of two ways:

(1) The sensitive axis of the accelerometer is mounted in the aircraft in a direction parallel to the horizon to sense the forward acceleration of the aircraft and the sensed acceleration signal is compensated for pitch changes of the aircraft by means of a pitch signal derived from a suitable inertial source such as a vertical gyro. This procedure constitutes the data stabilization technique taught in the aforementioned application Serial No. 821,035.

(2) The accelerometer is mounted on a stable platform in order that the sensitive axis of the accelerometer retains its desired orientation irrespective of the attitude of the aircraft.

Both of the aforementioned prior art approaches have disadvantages. Data stabilization requires an expensive vertical gyro as well as additional apparatus to compensate for the undesired erection of the vertical gyro while the aircraft is being accelerated in a direction perpendicular to the axis of the gyro. This technique entails undue complexity and imposes limits on the accuracy with which the forward acceleration may be determined. The requirement for an inherently complex and extremely expensive stable platform generally cannot be justified on the basis of the need for an accurate forward acceleration signal in itself.

Therefore it is a primary object of the present invention to provide a measure of the acceleration of a craft in a reference direction irrespective of changes of attitude of the craft within a predetermined range of attitude change which has a minimum of system complexity.

It is an additional object of the present invention to provide a measure of the forward acceleration of an aircraft moving along a lineal path in space such as a runway surface irrespective of the pitch attitude changes of the craft within a predetermined range of attitude change which provides a true acceleration measure with a minimum of sensing, compensating and supporting equipment.

The present invention provides a measure representative of the forward acceleration of a craft, for example, by mounting two accelerometers on the craft with their sensitive axes perpendicular with respect to each other in order that they are responsive to accelerations parallel to the longitudinal and vertical axes of the craft respectively. The longitudinal and vertical acceleration measures from the respective accelerometers are applied to a computing device which provides a measure proportional to $$a_1 - \frac{a_2}{a_1}(1-a_2)$$

which is representative of the forward acceleration of the craft where $a_1$ is proportional to the longitudinal acceleration and $a_2$ is proportional to the vertical acceleration.

The invention will now be described with reference to the following drawings in which:

FIG. 1 is a side view of an aircraft accelerating along a runway having components of the invention mounted therein; and FIG. 2 is a schematic wiring diagram of a preferred embodiment of the invention.

The theory of the invention will now be described with reference to FIG. 1. A linear longitudinal accelerometer 10 is mounted in an aircraft in order that it is responsive to accelerations parallel to the longitudinal axis 11 of the craft and provides a longitudinal acceleration signal $a_1$ representative thereof. A linear normal accelerometer 12 is also mounted on the craft responsive to accelerations parallel to the vertical axis 13 of the craft for providing a vertical acceleration signal $a_2$ representative thereof. The problem solved by the present invention is to obtain a measure representative of the forward acceleration $a_x$ of the aircraft as it accelerates along a runway where the $a_x$ vector is displaced by an angle $\theta$ with respect to the $a_1$ vector.

Based on the sensed accelerations $a_1$ and $a_2$ where $a_z$ is the true vertical acceleration:

$$a_x = a_1 \cos\theta - a_2 \sin\theta$$
$$a_z = a_2 \cos\theta + a_1 \sin\theta$$

or $$\sin\theta = \frac{a_z - a_2 \cos\theta}{a_1}$$

consequently, $$a_x = a_1 \cos\theta - \frac{a_2}{a_1}(a_z - a_2 \cos\theta)$$

For small values of $\theta$, $\sin\theta \cong \theta$ and $\cos\theta \cong 1.0$ $$\therefore a_x = a_1 - \frac{a_2}{a_1}(a_z - a_2)$$

If the $x$ direction is parallel to the runway and the $z$ direction perpendicular to the runway, the low frequency component of $a_z$ will be unity, i.e., the mean vertical velocity experienced by the aircraft prior to lift-off is zero. Thus, filtering the high frequency components of $a_1$ and $a_2$ will provide the relationship $$a_x = a_1 - \frac{a_2}{a_1}(1-a_2)$$

for the low frequency component of $a_x$.

The technique explained above thus provides a true measure of $a_x$ by compensating $a_1$ for the effect of pitch by sensing the component of $a_x$ in the $a_2$ direction, $(1-a_2)$, and providing the total required correction by multiplying this component by the amplifying factor $$\left(\frac{a_2}{a_1}\right)$$

A preferred embodiment of a device which may be utilized to determine the forward acceleration $a_x$ of an aircraft on the basis of the accelerometer outputs $a_1$ and $a_2$ is shown in FIG. 2. A servo balanced bridge multiplying circuit 20 simultaneously performs the multiplication and division operations in order to provide a signal representative of the term $$\frac{a_2}{a_1}(1-a_2)$$

in a manner to be explained. The bridge circuit 20 may be of the type disclosed on page 56 of "Analog Methods in Computation and Simulation," by Walter W. Soroka, published by the McGraw-Hill Book Company, Inc., 1954. The bridge circuit 20 has variable resistors 21, 22, 23 and 24 disposed in respective arms thereof. A power supply 25 is connected across one diagonal of the bridge circuit 20 while a balancing relay servo 26 is connected across the other diagonal. The relay servo 26 may be of the type described on page 56 of the aforementioned text.

The longitudinal accelerometer 10 is connected to position the wiper of the variable resistor 21 in order to provide an electrical signal in the bridge circuit 20 representative of the acceleration $a_1$. The normal accelerometer 12 is connected to position the wiper of the variable resistor 22 in order to provide an electrical signal in the bridge circuit 20 representative of the acceleration $a_2$. The normal accelerometer 12 is further connected to position the wiper of the variable resistor 23 in order to provide an electrical signal in the bridge circuit 20 representative of one minus the acceleration $a_2$. The servo 26 is connected to position wiper of the variable resistor 24 in a direction to null the output of the bridge circuit 20 and thus a signal is provided representative of $$\frac{a_2}{a_1}(1-a_2)$$

In order to provide a signal representative of $$\frac{a_2}{a_1}(1-a_2)$$

externally of the bridge circuit 20, a potentiometer 30 has its wiper ganged to the wiper of the variable resistor 24 and driven by the servo 26. The potentiometer 30 is energized by a power supply 31. The potentiometer 30 has its wiper connected to an algebraic summation bridge circuit 32 in order to provide a signal representative of $$\frac{a_2}{a_1}(1-a_2)$$

thereof.

In order to provide a signal representative of $a_1$, a potentiometer 33 has its wiper ganged to the wiper of the variable resistor 21 and is thus positioned by the longitudinal accelerometer 10. The potentiometer 33 is energized by a power supply 34.

The bridge circuit 32 has resistors 35, 36, 37 and 38 of equal value disposed in the respective arms thereof. The junction of the resistors 37 and 38 is connected to the power source 34. The wiper of the potentiometer 33 is connected through a balancing potentiometer 40 to the junction of the resistors 35 and 36 thereby providing a signal representative of $a_1$ to the bridge circuit 32. The wiper of the potentiometer 30 is connected to the junction of the resistors 35 and 38 while the junction of the resistors 36 and 37 is connected through a resistor 41 to ground potential.

The output terminals 42 and 43 of the bridge circuit 32 are connected to the junction of the resistors 36 and 37 and to the junction of the resistors 37 and 38 respectively, in order that an output signal is provided from the bridge circuit 32 representative of $$a_1 - \frac{a_2}{a_1}(1-a_2)$$

which is equal to $a_x$, i.e., the forward acceleration of the aircraft.

In the operation of the circuit of FIG. 2, as the aircraft proceeds along the runway, the longitudinal accelerometer 10 sense the accelerations experienced by the craft parallel to its longitudinal axis 11 while the normal accelerometer 12 senses the accelerations parallel to the vertical axis 13. The ganged wipers of the variable resistor 21 and the potentiometer 33 are positioned in accordance with the longitudinal acceleration sensed by the accelerometer 10. Simultaneously, the wiper of the variable resistor 22 is positioned in accordance with the normal acceleration sensed by the accelerometer 12 while the wiper of the variable resistor 23 is positioned in accordance with one minus the normal acceleration.

In response to the signals generated by the variable resistors 21, 22 and 23, the servo 26 positions the wiper of the variable resistor 24 in a direction to null the current flow through the bridge circuit 20 thereby providing a signal from the ganged wiper of the potentiometer 30 representative of $$\frac{a_2}{a_1}(1-a_2)$$

which is applied to the bridge circuit 32. Simultaneously, the $a_1$ signal from the potentiometer 33 is applied to the bridge circuit 32 and the difference therebetween appears as an output signal across the output terminals 42 and 43. This output signal is proportional to $$a_1 - \frac{a_2}{a_1}(1-a_2)$$

to provide a measure of the forward acceleration $a_x$ of the aircraft in accordance with the theory explained initially.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for providing a measure of the acceleration of a craft in a reference direction irrespective of changes in the attitude of said craft within a predetermined range of attitude change where the craft is constrained to move along a lineal path in space comprising first accelerometer means responsive to accelerations parallel to an axis of said craft lying in the plane defined by said axis and said reference direction for providing a first signal representative thereof, said craft axis and said reference direction being displaced with respect to each other by a small angle, second accelerometer means responsive to accelerations perpendicular to said axis and lying in said plane for providing a second signal representative thereof, and computing means responsive to said first and second signals for providing a measure proportional to $$a_1 - \frac{a_2}{a_1}(1-a_2)$$

which is representative of the acceleration of the craft in the reference direction where $a_1$ is the first signal and $a_2$ is the second signal.

2. Apparatus for providing a measure of the forward acceleration of an aircraft irrespective of changes in pitch attitude of the aircraft within a predetermined range of pitch attitude change comprising first accelerometer means mounted on said craft responsive to accelerations parallel to the longitudinal axis of said craft for providing a first signal representative thereof, second accelerometer means mounted on said craft responsive to accelerations parallel to the vertical axis of the craft for providing a second signal representative thereof, and computing means responsive to said first and second signals for providing a measure proportional to $$a_1 - \frac{a_2}{a_1}(1-a_2)$$

which is representative of the forward acceleration of the craft where $a_1$ is the first signal and $a_2$ is the second signal.

3. Apparatus for providing a measure of the forward acceleration of an aircraft irrespective of changes in the pitch attitude of the aircraft within a predetermined range of pitch attitude change comprising first accelerometer means responsive to accelerations parallel to the longitudinal axis of said craft for providing a first signal representative thereof, second accelerometer means responsive to accelerations parallel to the vertical axis of said craft for providing a second signal representative thereof, means responsive to said second accelerometer means for providing a third signal representative of one minus said second signal, computing means responsive to said first, second and third signals for providing a fourth signal representative of the second signal multiplied by the third signal divided by the first signal, and algebraic summation means responsive to said first and fourth signals for providing an output signal representative of the difference therebetween which is a measure of the forward acceleration of said craft.

4. Apparatus for providing a measure of the forward acceleration of an aircraft moving along a runway irrespective of changes in the pitch attitude of the aircraft within a predetermined range of pitch attitude change comprising first accelerometer means responsive to accelerations parallel to the longitudinal axis of said craft for providing a first signal representative thereof, second accelerometer means mounted on said craft perpendicular with respect to said first accelerometer and responsive to accelerations parallel to the vertical axis of said craft for providing a second signal representative thereof, means responsive to said second accelerometer for providing a third signal representative of unity minus said second signal, servo balanced bridge multiplying means having first, second and third arms responsive to said first, second and third signals respectively, said bridge means being so constructed and arranged that adjustment of its fourth arm provides a fourth signal representative of the second signal multiplied by the third signal divided by the first signal, said bridge means including servo means for adjusting the fourth arm of said bridge means to provide a fourth signal representative of the second signal multiplied by the third signal divided by the first signal, and algebraic summation means responsive to said first and fourth signals for providing an output signal representative of the difference therebetween which is a measure of the forward acceleration of said aircraft.

5. Apparatus for providing a measure of the forward acceleration of an aircraft moving along a runway comprising first accelerometer means responsive to accelerations parallel to the longitudinal axis of said craft for providing a first signal representative thereof, second accelerometer means responsive to accelerations parallel to the vertical axis of said craft for providing a second signal representative thereof, servo balanced bridge multiplying means having first, second, third and fourth arms, first, second, third and fourth variable resistors disposed in said first, second, third and fourth arms respectively, said first and second variable resistors being responsive to said first and second accelerometers respectively, said third variable resistor being responsive to said second accelerometer for providing a third signal representative of one minus said second signal, said bridge means being so constructed and arranged that adjustment of its fourth arm provides a fourth signal representative of the second signal multiplied by the third signal divided by the first signal, said bridge means including servo means for adjusting the fourth variable resistor of said bridge in a direction to null said bridge means thereby providing a fourth signal representative of the second signal multiplied by the third signal divided by the first signal, and algebraic summation means responsive to said first and fourth signals for providing an output signal representative of the difference therebetween which is a measure of the forward acceleration of said aircraft.

References Cited in the file of this patent
UNITED STATES PATENTS
2,613,071    Hansel _____ Oct. 7, 1952